US006840008B1

(12) United States Patent
Bullock et al.

(10) Patent No.: US 6,840,008 B1
(45) Date of Patent: Jan. 11, 2005

(54) VERTICAL PLANTING SYSTEM

(76) Inventors: Chester C. Bullock, P.O. Box 20685, Bradenton, FL (US) 34204; Susan G. Roberts, P.O. Box 20685, Bradenton, FL (US) 34204

( * ) Notice: Subject to any disclaimer, the term of this patent is extended or adjusted under 35 U.S.C. 154(b) by 0 days.

(21) Appl. No.: 10/682,499

(22) Filed: Oct. 9, 2003

(51) Int. Cl.[7] .............................................. A01G 25/02
(52) U.S. Cl. ................................................ 47/82; 47/83
(58) Field of Search ................................ 47/83, 86, 82, 47/66.5

(56) References Cited

U.S. PATENT DOCUMENTS

| | | | | |
|---|---|---|---|---|
| 4,216,617 | A | * 8/1980 | Schmidt | 47/62 A |
| 4,419,843 | A | * 12/1983 | Johnson, Sr. | 47/82 |
| 5,136,807 | A | 8/1992 | Orlov | |
| 5,305,551 | A | 4/1994 | Orlov | |
| 5,309,671 | A | * 5/1994 | Byun | 47/83 |
| 5,428,922 | A | 7/1995 | Johnson | |
| 5,438,797 | A | 8/1995 | Lendel | |
| 5,502,922 | A | 4/1996 | Shlomo | |
| 5,533,302 | A | 7/1996 | Lynch et al. | |
| 5,918,416 | A | 7/1999 | Ammann, Jr. | |
| 6,178,692 | B1 | 1/2001 | Graven | |
| 6,393,764 | B1 | 5/2002 | Smith | |
| 6,470,625 | B1 | * 10/2002 | Byun | 47/82 |
| 6,477,805 | B2 | 11/2002 | Ware | |
| 6,612,073 | B1 | * 9/2003 | Powell et al. | 47/83 |

FOREIGN PATENT DOCUMENTS

| | | | | |
|---|---|---|---|---|
| EP | 291384 A1 | * 11/1988 | | A01G/9/02 |
| FR | 2520972 A | * 8/1983 | | A01G/9/02 |
| WO | WO 98/56233 | * 12/1998 | | A01G/9/02 |

* cited by examiner

Primary Examiner—Son T. Nguyen
(74) Attorney, Agent, or Firm—Charles J. Prescott (57) ABSTRACT

A vertical planting system comprising individual growing containers each having a bottom wall, outwardly tapered side walls defining a hollow interior and an open top surface, the upper margins of the side walls thereof defining discrete radially extending spaced upwardly facing planting areas. The containers are vertically stackable one on top of the next in self-aligning fashion to form a vertical growing column supported by an elongated upright support pole driven into the ground and inserted through an aperture in the bottom wall of each container. A nutrient and water diffuser box is vertically stackable and self aligning atop a top of one of the containers in the growing column and support pole receiving aperture formed therethrough and slidably engaged over the support pole, the bottom of the diffuser box also including fluid drainage hole formed through and positioned over said bottom wall of said diffuser box. A fluid collector structured to supportively receive and be self-aligned with a bottom one of the containers in the growing column are also provided. A fluid nutrient and water discharge unit flows fluid nutrient and water into the diffuser box for downwardly draining through a central portion of growing media in each successive container.

9 Claims, 7 Drawing Sheets

VERTICAL PLANTING SYSTEM

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to systems for growing plants and vegetables, and more particularly to a vertical growing system having individual containers each having a plurality of upwardly facing planting areas and nourished primarily from a single source location of nutrients and water which filters centrally downwardly therethrough.

2. Description of Related Art

Vertical planters which define vertical columns of planting pots which are irrigated by central irrigation sources are well known. One such column planter is disclosed in U.S. Pat. No. 5,305,551 invented by Orlov which teaches a column planter supported within a tank filled with water including planting pots which are stackable one on top of each other to form at least one column supported within the water-filled tank.

Orlov has also invented an arrangement for growing plants as disclosed in U.S. Pat. No. 5,136,807 teaching a multiplicity of containers which are stacked to form a self-supporting column. Irrigation water flowing downwardly through each of the apertured containers flows into an excess fluid draining system of this disclosure.

In U.S. Pat. No. 5,533,302, Lynch teaches a modular planting system for growing a plurality of plants arranged in a vertical column. Modular planting units are stacked together facilitating a virtually continuous vertical central column of growing medium for supporting plants in pairs of plant receptacles which project from both sides of the center column.

Johnson, in U.S. Pat. No. 5,428,922, teaches a multi-ter garden planter including a plurality of retaining tubes centrally supporting a plurality of vertically oriented spaced apart flared tubs or receptacles each containing soil. An irrigation structure facilitates plant growth. The tubs are formed of arcuate segments of lightweight sheet plastic material connected together by a unique locking assembly for convenient transport and storage.

Another vertical planter disclosed by Lendel in U.S. Pat. No. 5,438,797, includes spaced apart tiered flower pots centered about an upright pole which is segmented to allow disassembly and shipping. Soil in each of the flower pots contributes to the support of the entire vertical planter column.

The following additional U.S. Patents are known to applicant to teach other forms of vertical plant and vegetable growing columns as follows:

U.S. Pat. No. 6,178,692 to Graven
U.S. Pat. No. 5,918,416 to Ammann, Jr.
U.S. Pat. No. 6,393,764 to Smith
U.S. Pat. No. 6,477,805 to Ware
U.S. Pat. No. 5,502,922 to Shlomo The present invention also discloses a uniquely configured vertical planting system including identical individual growing containers which are vertically stackable in self-aligning and self-locking fashion and supported by an upright support pole which is driven into the ground for its support. Each of the growing containers includes outwardly tapering side walls which extend to define an open upper surface having uniformly spaced preferably round planting areas which extend downwardly into soil or growing media placed into the hollow interior of each growing container. A unique nutrient and water diffuser box receives water and nutrient from a multi-conduit source immediately above its open upper surface, diffusing the nutrient and water downwardly through the central portion of each of the growing containers, the excess fluid draining into a fluid connector positioned beneath the bottom of the container in the growing column for dispersion of the excess fluid into the ground.

BRIEF SUMMARY OF THE INVENTION

This invention is directed to a vertical planting system comprising individual growing containers each having a bottom wall, outwardly tapered side walls defining a hollow interior and an open top surface, the upper margins of the side walls thereof defining discrete radially extending spaced upwardly facing planting areas. The containers are vertically stackable one on top of the next in self-aligning fashion to form a vertical growing column supported by an elongated upright support pole driven into the ground and inserted through an aperture in the bottom wall of each container. A nutrient and water diffuser box is vertically stackable and self aligning atop a top of one of the containers in the growing column and support pole receiving aperture formed therethrough and slidably engaged over the support pole, the bottom of the diffuser box also including fluid drainage hole formed through and positioned over said bottom wall of said diffuser box. A fluid collector structured to supportively receive and be self-aligned with a bottom one of the containers in the growing column are also provided. A fluid nutrient and water discharge unit flows fluid nutrient and water into the diffuser box for downwardly draining through a central portion of growing media in each successive container.

It is therefore an object of this invention to provide a vertical planting system having STYROFOAM molded individual identical growing containers which are self-aligning and vertically stackable such that the planting areas of each container are unobstructed for plant growth by the next upwardly positioned growing container whose planting areas have been automatically rotationally offset about an upright central axis by the self-aligning structure of each of the containers.

Still another object of this invention is to provide an easily assemblable multi-tiered vertical planting system having identical growing containers which may be stacked in a range of selected numbers to define a vertical growing column of any desirable reasonable height.

Still another object of this invention is to provide a vertical planting system with a unique and easily managed nutrient and water flow control system which flows liquid nutrient and water by dispersion centrally downwardly through the central portion of the growing media within each of the system growing containers.

Yet another object of this invention is to provide a vertical planting system which includes a plurality of identical growing containers formed of molded STYROFOAM for light weight and economy and which include self-aligning and self-locking structure for facilitating quick assembly and proper alignment and offset orientation between each upwardly successive growing container.

In accordance with these and other objects which will become apparent hereinafter, the instant invention will now be described with reference to the accompanying drawings.

DETAILED DESCRIPTION OF THE INVENTION

Figure 1:
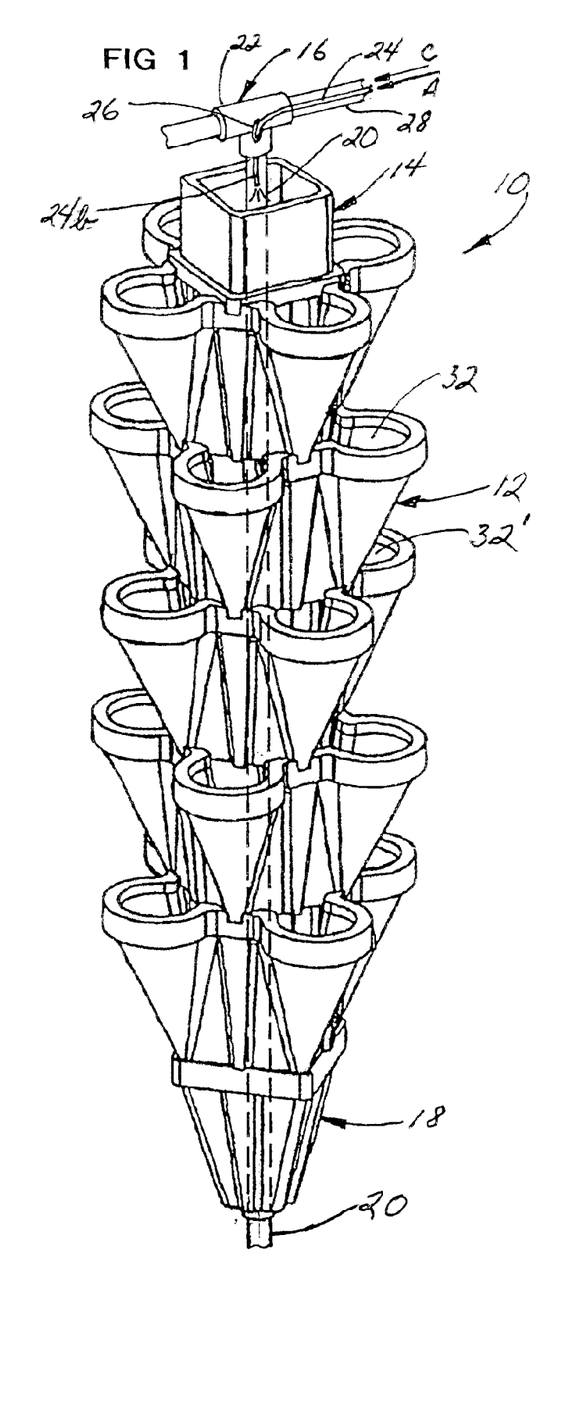
FIG. 1 is a perspective view of the vertical plant growing system of the present invention.
Figure 1A:
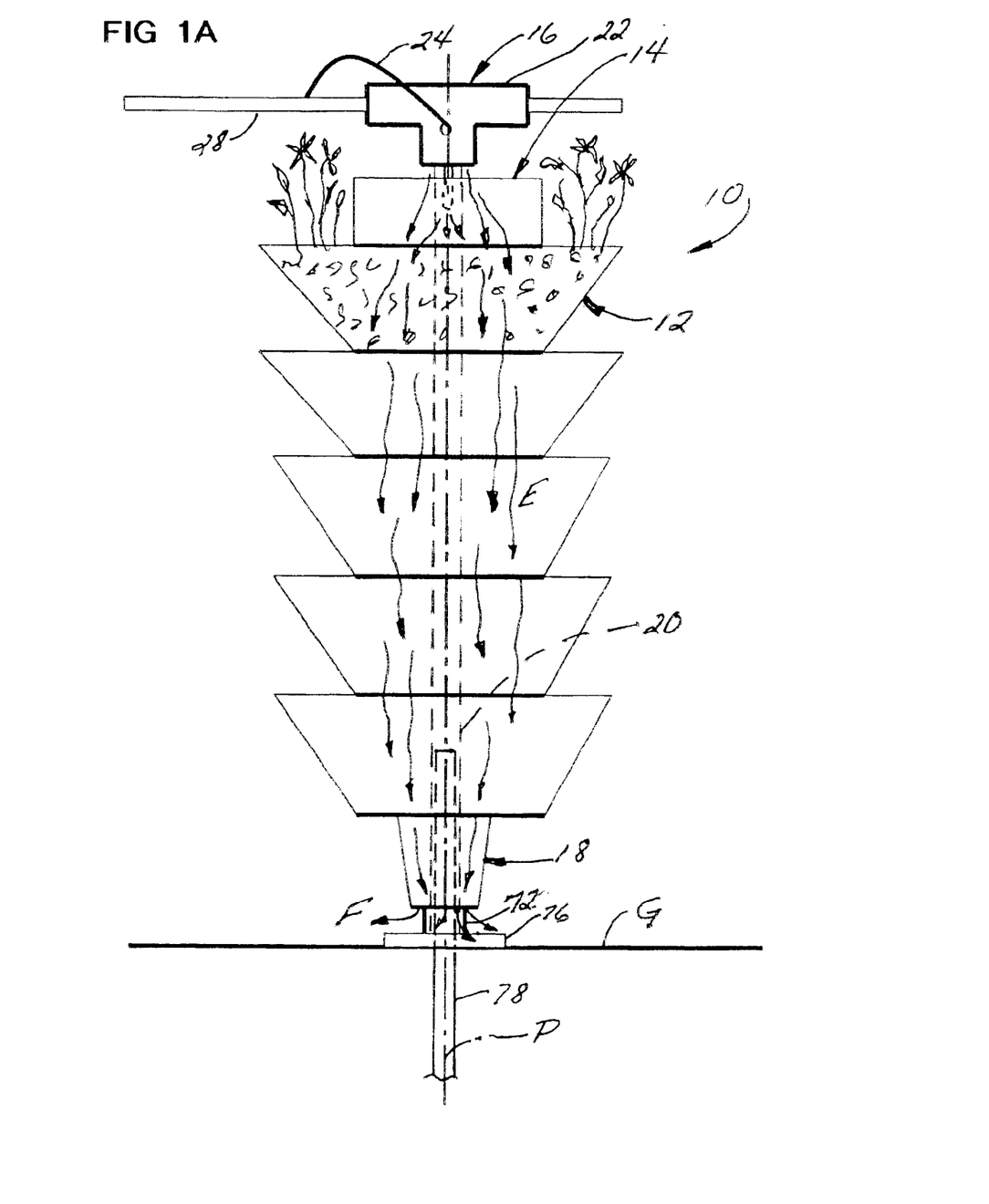
FIG. 1A is a schematic side elevation simplistic schematic view of the invention.

Referring now to the drawings and particularly to FIGS. 1 and 1A, the system of the invention is there shown generally at numeral 10 as a vertical planting system which includes a plurality of growing containers 12 each formed as a single unit of molded STYROFOAM and stackably arranged in self-aligning and self-locking fashion into a vertical column about a central upright axis P of an elongated upright support pole 20. The invention 10 also includes a nutrient and water diffuser box 14 positioned at the top of the column of growing containers 12 and a fluid collector 18 which supports the column of containers 12 and is positioned directly against the bottom surface of the bottom one of the containers 12.

As also seen in FIG. 1A, the fluid collector 18 is supported atop a swivel plate 76 which is positioned atop the ground G around an elongated ½" o.d. ground stake 78 which is first driven into the ground a distance of about 24", the remaining 16" thereof extending above the swivel plate 76 to slidably support the lower end of the support pole 20 of larger, ¾" o.d. to slidably fit over the ground stake 78.

Figure 2:
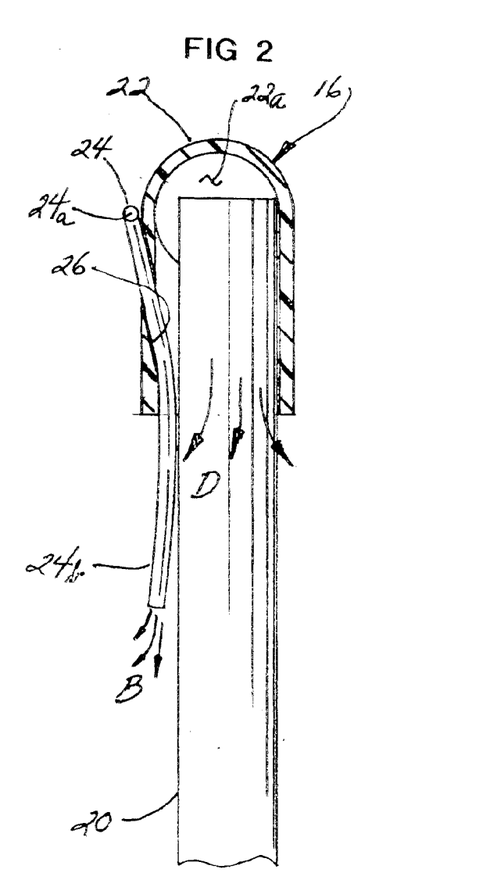
FIG. 2 is a side elevation section view of the fluid nutrient and water discharge member 16 shown in FIG. 1.

As also seen in FIG. 2, the fluid nutrient and water discharge unit 16 includes a T-fitting 22 connected at one horizontal leg thereof to a water supply conduit 28 and at a downwardly extending leg thereof supportively over the upper end of the support pole 20. A separate liquid nutrient supply conduit 24 extends into an aperture 26 formed in the side of the downwardly extending leg of the T-fitting 22 and is fitted between the outside diameter of the support pole 20 and the inside wall of the downward leg of the T-fitting 22.

By this arrangement, water flows in the direction of arrow C through water conduit 28 into the interior 22a of the T-fitting 22 and downwardly in the direction of arrows D along the outside of the support pole 20. Separately, fluid nutrient flows downwardly in the direction of arrows B from the lower end 24b of the nutrient supply conduit 24 into the nutrient and water diffuser box 14 which disperses these fluids as described more completely herebelow.

Again referring to FIG. 1A, these fluid nutrients and water flow downwardly through the central portions of the nutrient and diffuser box 14, then centrally through the growing medium contained in each of the containers 12 in the direction of arrow B, and finally into the fluid collector 18 for discharge in the direction of arrows F onto and into the ground G as facilitated by a gap around the support pole 20.

Referring additionally to FIGS. 3 to 6, the details of the growing container 12 are there shown. Each growing container 12 includes a bottom wall 36, upwardly and outwardly expanding side walls shown typically at 34, and an open upper surface including a plurality of generally round planting areas 32 defined by the upper margins 30 of the side walls 34. Each of the growing containers 12 is formed as a single unit of relatively thick walled molded STYROFOAM for lightness, strength and economy of manufacture.

The side walls 34 are preferably of a conical-like upwardly extending configuration and collectively define a hollow upwardly facing interior 46 which is filled with a growing medium or, more conventionally dirt (not shown for clarity), which is filled up to in proximity to the upper margins 30 of the side walls 34. The bottom wall 36 includes a central support pole receiving aperture 44 and a plurality of drainage holes 38. These drainage holes 38 function to facilitate the downward flow of nutrient and water in the direction of arrow E as previously described in FIG. 1A.

Figure 3:
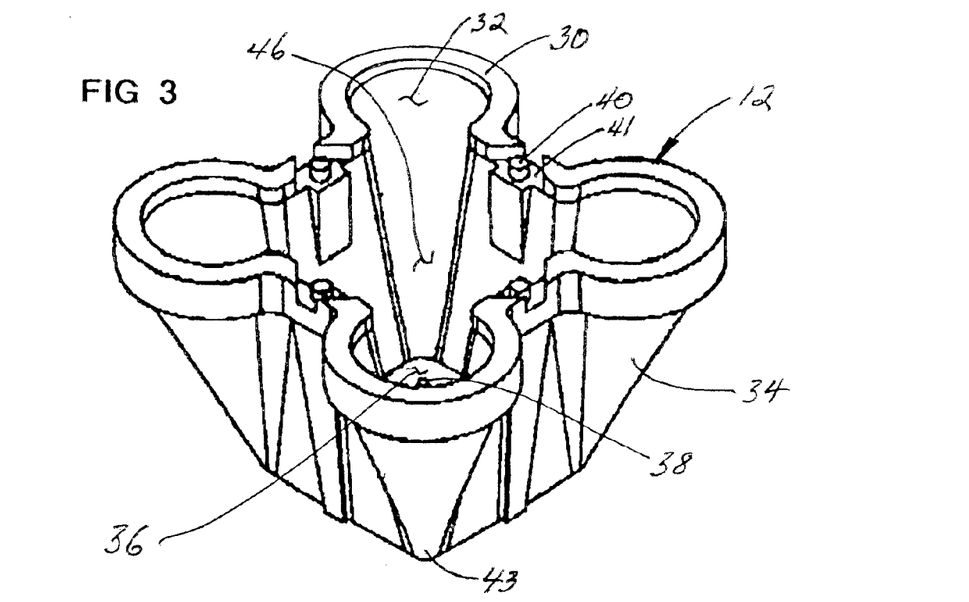
FIG. 3 is an upper perspective view of a growing container of the invention.
Figure 4:
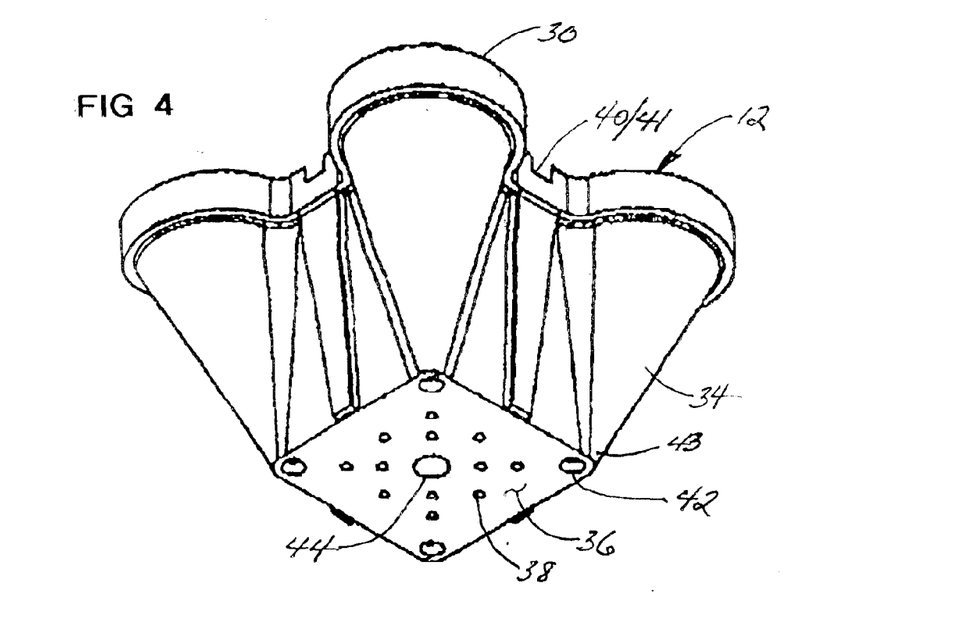
FIG. 4 is a lower perspective view of the growing container of the invention.
Figure 5:
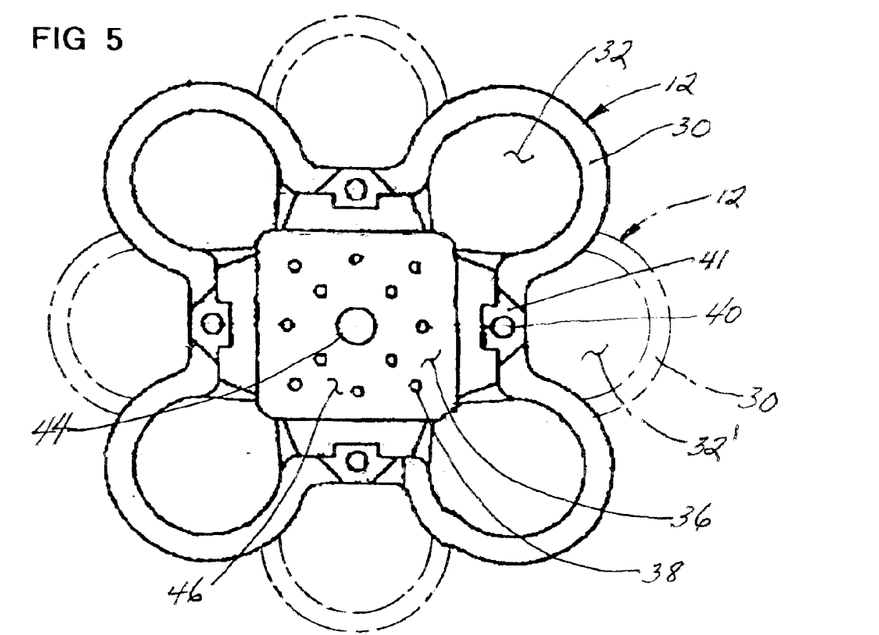
FIG. 5 is a top plan view of the growing container showing the next lower growing container in a vertical column of growing containers in phantom.
Figure 6:
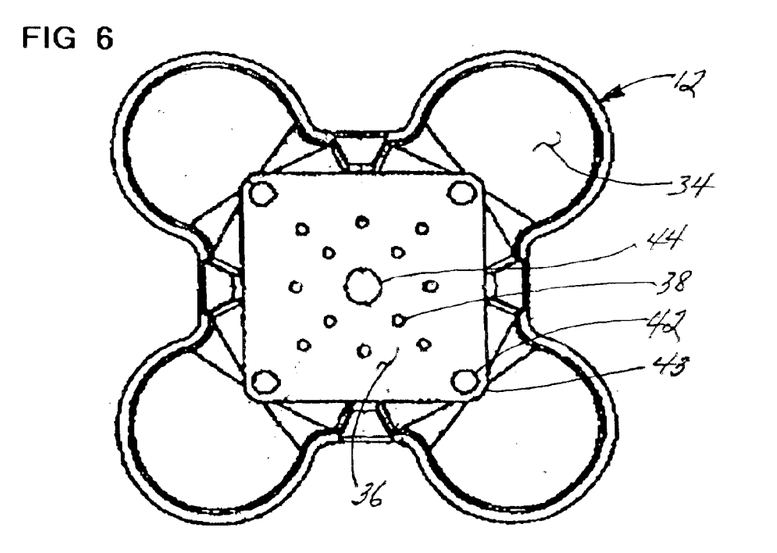
FIG. 6 is a bottom plan view of the growing container.

Formed in the bottom wall 36 are corner alignment cavities 42 as best seen in FIGS. 4 and 6 which receive and self-align with molded pins 40 formed into the upper margin 30 as best seen in FIGS. 3 and 5. An alignment notch 41 is also provided around each of the alignment pins 40, the notches 41 substantially mating with the outer lower corners 43 of each of the containers 12 positioned immediately adjacent the alignment cavities 42. By this arrangement, the self-aligning, self-locking column-stacking features of the growing containers 12 are thereby achieved.

As shown, the preferred embodiment of the invention 10 incorporates an orthogonal or 90° orientation of four separate growing areas 32 defined by four separate conically-shaped upwardly expanding side walls 34 and the associated upper margins 30 thereof. Vertical misalignment of the successive growing areas 32 and 32' as seen in FIG. 5 in phantom of each upwardly and downwardly successive growing container is achieved by the 45° non-alignment of successive growing containers 12, again as best seen in FIGS. 1 and 5.

Figure 7:
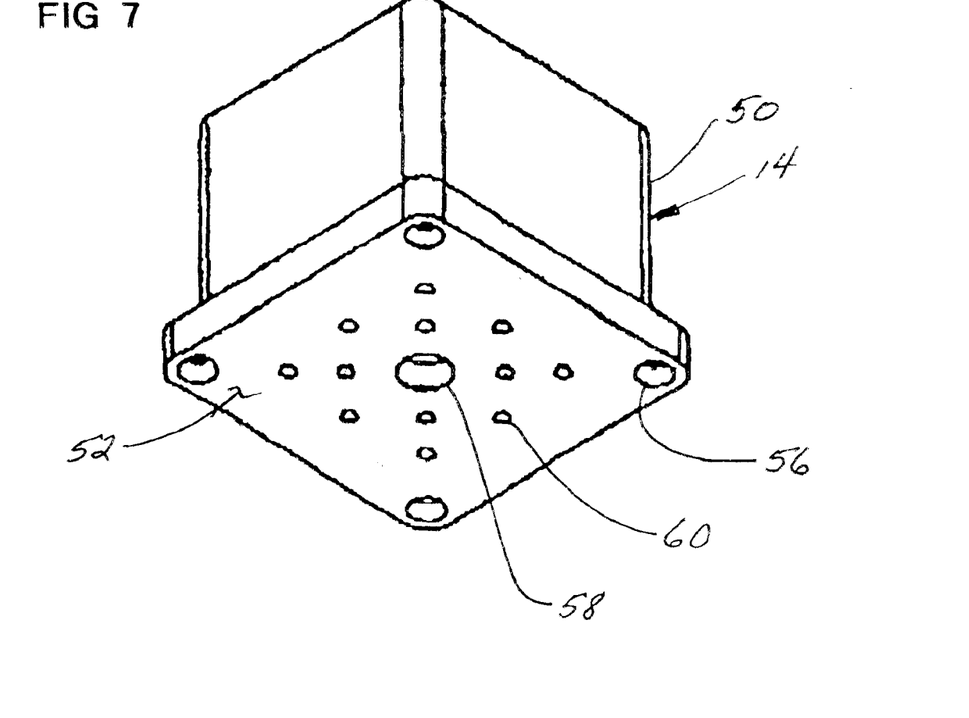
FIG. 7 is a lower perspective view of a nutrient and water diffuser box of the invention.
Figure 8:
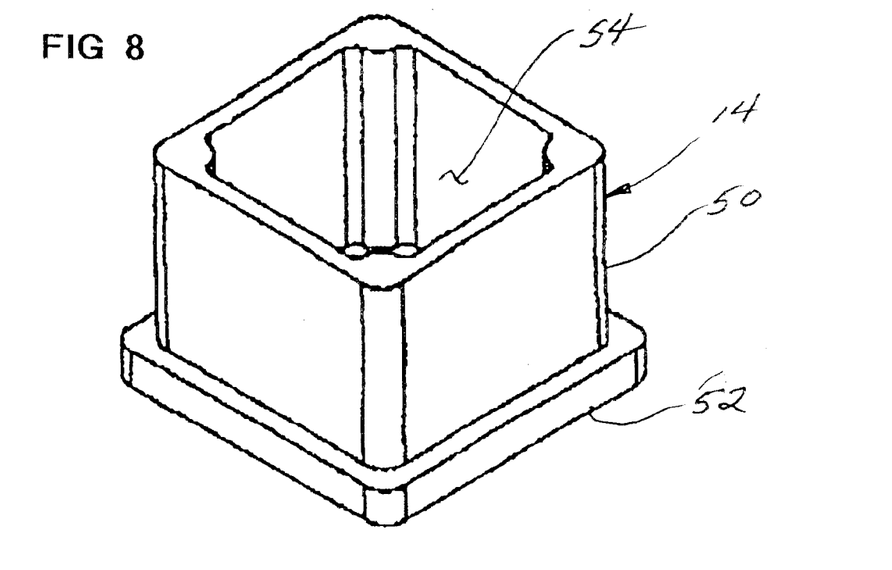
FIG. 8 is an upper perspective view of the nutrient and water diffuser box.
Figure 9:
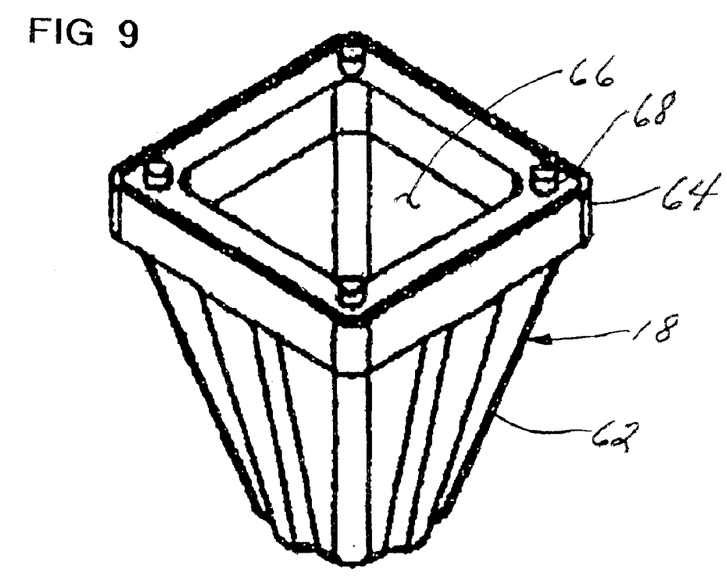
FIG. 9 is an upper perspective view of a fluid collector of the invention.
Figure 10:
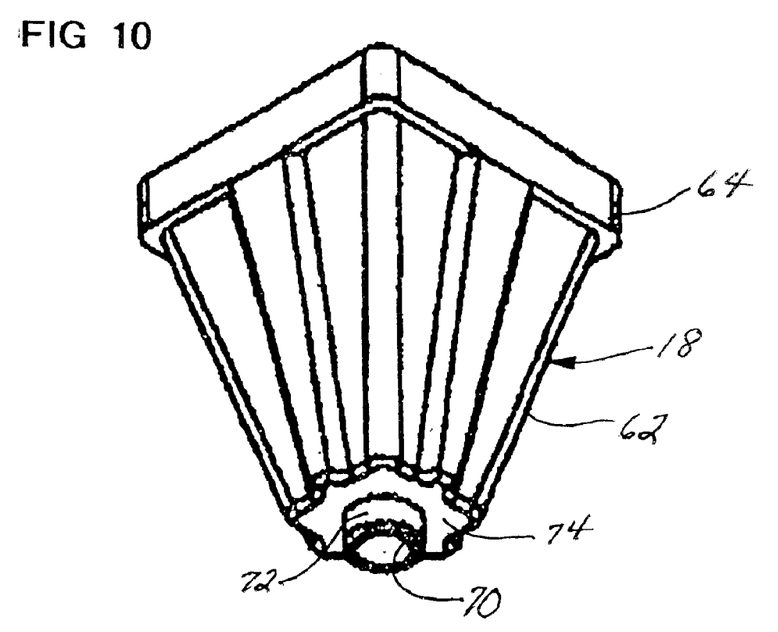
FIG. 10 is a lower perspective view of the fluid collector.
Figure 11:
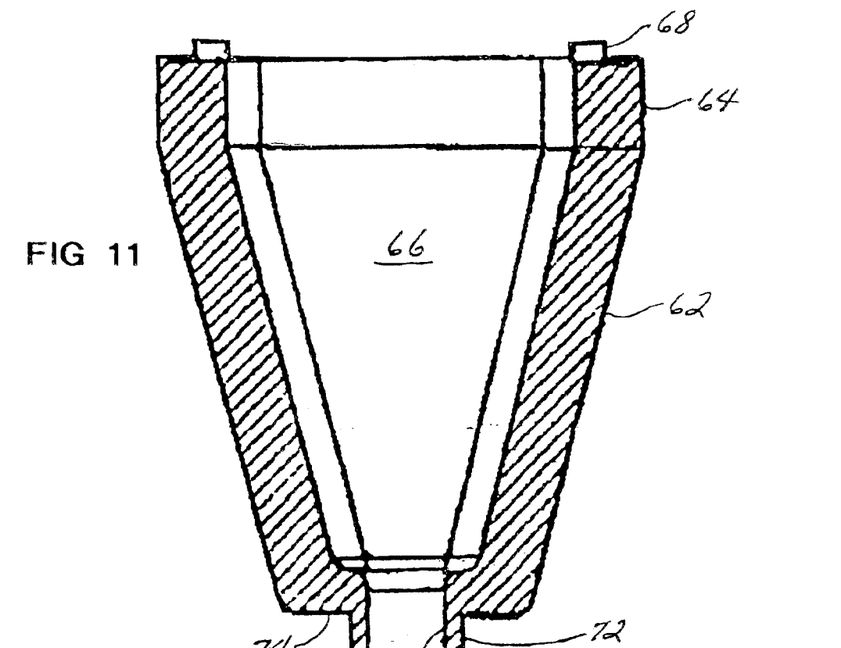
FIG. 11 is a vertical section view of the fluid collector.
Figure 12:
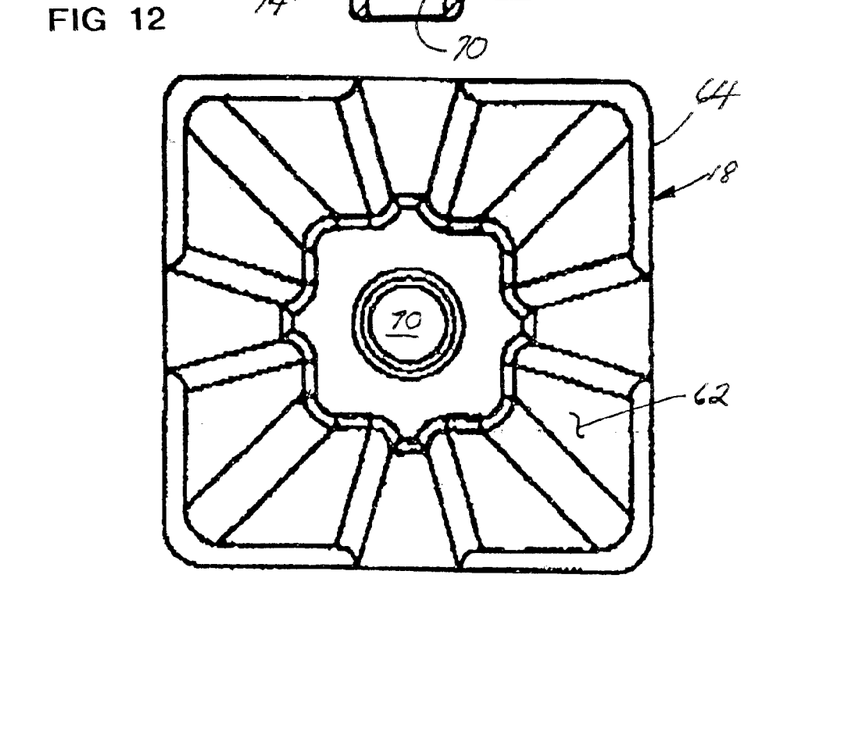
FIG. 12 is a bottom plan view of the fluid collector.

Referring now to FIGS. 7 and 8, the nutrient and water diffuser box 14 is there shown. This diffuser box 14 also formed of molded thick walled STYROFOAM formed as a unit includes a bottom wall 52 having a central pole support receiving aperture 58 and drainage apertures 60 formed downwardly therethrough. Alignment cavities 56 which mate with, and are self-aligned by, the molded pins 40 of the top growing container 12 atop which the diffuser box 14 is positioned are also provided in the bottom wall 52. Side walls 50 upwardly extend to define an open top surface 54 into which the fluid nutrient and water flow for downward dispersion through drain holes 38 as previously described.

Referring lastly to FIGS. 9 to 12, the fluid collector 18 is there shown. This fluid collector 18 is also formed of very heavy wall molded STYROFOAM formed as a unit. The side walls 62 which outwardly extend from the bottom wall 74 are formed of extra heavy or thick STYROFOAM material for added strength as the fluid collector 18 supports the entire weight of the growing column of containers 12 and the growing medium and plants placed therewith.

The bottom wall 74 includes a support collar 72 having a central pole support receiving aperture 70 formed axially therethrough in alignment with a central axis P of the entire assembled system 10. Aperture 70 is also slightly larger than the o.d. of the support pole 20 to facilitate fluid drainage therebetween. The side walls 62 upwardly extend to a heavily strengthened upper margin 64 which defines an open upper surface 66. Upwardly extending alignment pins 68 are provided which mate with the cavities 42 formed in the bottom wall 36 of the growing containers 12.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A vertical planting system comprising:
    a plurality of individual substantially identical growing containers each having a bottom wall, outwardly tapered side walls defining a hollow interior and an open top surface;
    said open top surface of each said container, being defined by the upper margins of said side walls, defining a plurality of discrete radially extending planting areas spaced arcuately apart about a common central upright axis of each of said containers;
    said top surface of each of said containers having a substantially greater surface area than that of said bottom wall, each said bottom wall of each said containers having a central support pole receiving aperture formed therethrough coaxial with said central upright axis and fluid drainage holes formed therethrough;
    said bottom wall of each said container also having a corner alignment cavity positioned and sized to receive an alignment pin formed within and upwardly extending from an alignment notch formed into each said upper margin of said container, said alignment notch substantially mating with a corner of said bottom wall of said container;
    said containers being vertically stackable and self-aligning one directly on top of the next to form a growing column supported by an elongated upright support pole driven into the ground and inserted through each said aperture of each of said containers in coaxially alignment with the upright axis;
    a nutrient and water diffuser box having a bottom wall and upwardly extending side walls and an open top surface defining a substantially open interior, said diffuser box vertically stackable and self aligning directly atop and supported on a top of one of said containers in the growing column, said bottom wall of said diffuser having a central support pole receiving aperture formed therethrough slidably engaged over an upper end of the support pole, said bottom of said diffuser box also including fluid drainage holes;
    a fluid collector having a bottom wall, outwardly tapered side walls and an open top surface structured to supportively receive and be self-aligned directly against a bottom one of said containers in the growing column, said bottom wall of said fluid collector having a central support pole receiving aperture formed therethrough and slidably engaged over a lower portion of the support pole.

2. A vertical planting system as set forth in claim 1, wherein:
    said bottom wall of said diffuser box also having a corner alignment cavity positioned and sized to receive said pin in self-aligning fashion with said upper margin of said container.

3. A vertical planting system as set forth in claim 2, wherein:
    said open top surface of said fluid collector being defined by an upper margin thereof which also has an inwardly extending alignment pin which aligns with and engages into said alignment cavity of said container.

4. A vertical planting system comprising:
    a plurality of individual substantially identical molded growing containers each having a bottom wall, outwardly tapered side walls defining a hollow interior adapted to hold growing media therein, and an open top surface;
    said open top surface of each said container, being defined by the upper margins of said side walls, defining a plurality of discrete radially extending substantially round planting areas arcuately evenly spaced apart about a central upright axis of each of said containers and extending downwardly into said hollow interior;
    said top surface of each of said container having a substantially greater surface area than that of said bottom wall, said bottom wall having a central support pole receiving aperture formed therethrough coaxial with said central upright axis and fluid drainage holes also formed therethrough;
    said bottom wall of each said container also having a corner alignment cavity positioned and sized to receive an alignment pin formed within and upwardly extending from an alignment notch formed into each said upper margin of said container, said alignment notch substantially mating with a corner of said bottom wall of each said container;
    said containers being vertically stackable and self-aligning one directly on top of the next to form a vertical growing column supported by an elongated upright support pole driven into the ground for support and inserted through each said aperture of each bottom wall of said containers, each upwardly successive container rotationally offset about the upright axis in self-aligning fashion whereby each of said planting areas is unobstructed for plant growth by said planting areas of the container immediately thereabove;
    a nutrient and water diffuser box molded having a bottom wall, upwardly extending side walls and an open top surface defining a substantially open interior, said diffuser box vertically stackable and self aligning directly atop and supported on a top of one of said containers in the growing column, said bottom wall of said diffuser having a central support pole receiving aperture formed therethrough and slidably engaged over an upper end of the support pole, said bottom of said diffuser box also including fluid drainage holes formed therethrough;

a molded fluid funnel having a bottom wall, outwardly tapered side walls and an open top surface structured to directly supportively receive and be self-aligned beneath a bottom one of said containers in the growing column, said bottom wall of said fluid funnel having a central support pole receiving aperture formed therethrough which is slidably engaged over a lower portion of the support pole;

a fluid nutrient and water discharge positioned directly above said diffuser box whereby fluid nutrient and water flowing into said diffuser box will drain downwardly through a central portion of growing media in each downwardly successive container, a remainder of fluid nutrient and water flowing from said fluid funnel between the pole receiving aperture and the support pole directly onto the ground.

5. A vertical planting system as set forth in claim 4, wherein:

said bottom wall of said diffuser box also having a corner alignment cavity positioned and sized to receive said pin in self-aligning fashion with said upper margin of said container.

6. A vertical planting system as set forth in claim 5, wherein:

said open top surface of said fluid collector being defined by an upper margin thereof which also has an inwardly extending alignment pin which aligns with and engages into said alignment cavity of said container.

7. A vertical planting system comprising:

a plurality of individual substantially identical molded as a unit growing containers each having a bottom wall, conical-like upwardly expanding side walls defining a hollow interior holding growing media and an open top surface;

said open top surface of each said container, being defined by the upper margins of said side walls, defining four discrete radially extending substantially round upwardly facing planting areas orthogonally spaced apart one to another about a central upright axis of each of said containers and extending downwardly into said hollow interior;

said top surface of each of said container having a substantially greater area than that of said bottom wall, said bottom wall having a central support pole receiving aperture formed therethrough and fluid drainage holes also formed therethrough;

an elongated upright support pole adapted in length to be driven into the ground for support and having an exposed upright portion thereof;

said bottom wall of each said container also having a corner alignment cavity positioned and sized to receive an alignment pin formed within and upwardly extending from an alignment notch formed into each said upper margin of said container, said alignment notch substantially mating with a corner of said bottom wall of each said container;

said containers being vertically stackable one directly on top of the next in self-aligning fashion to form a vertical growing column supported by said support pole after being driven into the ground and inserted through each said aperture of each of said containers, each upwardly successive container rotationally offset about the axis in top plan view projected area whereby each of said planting areas is unobstructed for plant growth by next above said planting areas;

a nutrient and water diffuser box molded as a unit having a bottom wall, upwardly extending side walls and an open top surface defining a substantially open interior, said diffuser box vertically stackable and self aligning atop a top of one of said containers in the growing column, said bottom wall of said diffuser having a central support pole receiving aperture formed therethrough and slidably engaged over the support pole, said bottom of said diffuser box also including fluid drainage holes formed therethrough;

a fluid funnel molded as a unit having a bottom wall, outwardly tapered side walls and an open top surface structured to supportively receive and be self-aligned directly against and beneath a bottom one of said containers in the growing column, said bottom wall of said fluid funnel having a central support pole receiving aperture formed therethrough which is slidably engaged over a lower portion of the support pole;

a fluid nutrient and water discharge member positioned directly above said diffuser box whereby fluid nutrient and water flowing from said discharge member into said diffuser box will drain downwardly through a central portion of growing media in each downwardly successive container, a remainder of fluid nutrient and water flowing from said fluid funnel into the ground.

8. A vertical planting system as set forth in claim 7, wherein:

said bottom wall of said diffuser box also having a corner alignment cavity positioned and sized to receive said pin in self-aligning fashion with said upper margin of said container.

9. A vertical planting system as set forth in claim 8, wherein:

said open top surface of said fluid collector being defined by an upper margin thereof which also has an inwardly extending alignment pin which aligns with and engages into said alignment cavity of said container.

* * * * *